United States Patent
Luscombe et al.

(10) Patent No.: US 9,453,102 B2
(45) Date of Patent: Sep. 27, 2016

(54) SYNTHESIS OF CHALCOGEN-CAPPED PI-CONJUGATED POLYMERS

(71) Applicant: University of Washington through its Center for Commercialization, Seattle, WA (US)

(72) Inventors: Christine Keiko Luscombe, Seattle, WA (US); Ken Okamoto, Tsukuba (JP)

(73) Assignee: University of Washington through its Center for Commercialization, Seattle, WA (US)

( * ) Notice: Subject to any disclaimer, the term of this patent is extended or adjusted under 35 U.S.C. 154(b) by 0 days.

(21) Appl. No.: 14/518,951

(22) Filed: Oct. 20, 2014

(65) Prior Publication Data
US 2015/0112028 A1    Apr. 23, 2015

Related U.S. Application Data

(60) Provisional application No. 61/893,075, filed on Oct. 18, 2013.

(51) Int. Cl.
*C08G 75/00* (2006.01)
*C08G 61/12* (2006.01)

(52) U.S. Cl.
CPC ..... *C08G 61/126* (2013.01); *C08G 2261/1412* (2013.01); *C08G 2261/16* (2013.01); *C08G 2261/18* (2013.01); *C08G 2261/312* (2013.01); *C08G 2261/3142* (2013.01); *C08G 2261/3221* (2013.01); *C08G 2261/3223* (2013.01); *C08G 2261/417* (2013.01); *C08G 2261/70* (2013.01); *C08G 2261/72* (2013.01); *C08G 2261/964* (2013.01)

(58) Field of Classification Search
CPC .......................... C08G 61/126; H01L 51/0036
USPC ........................................................ 528/377
See application file for complete search history.

(56) References Cited

U.S. PATENT DOCUMENTS

2010/0117030 A1    5/2010  McCullough
2013/0248833 A1    9/2013  Hawker

FOREIGN PATENT DOCUMENTS

EP          2 246 376 A1    11/2010
WO      2009/056496 A1     5/2009
WO      2010/060159 A1     6/2010

OTHER PUBLICATIONS

Awada, H., et al., "Versatile Functional Poly(3-hexylthiophene) for Hybrid Particles Synthesis by the Grafting Onto Technique: Core@Shell ZnO Nanorods," Journal of Polymer Science, Part A: Polymer Chemistry 52(1):30-38, Jan. 2014.
Briseno, A.L., et al., "Oligo- and Polythiophene/ZnO Hybrid Nanowire Solar Cells," Nano Letters 10(1):334-340, Jan. 2010.
Bronstein, H.A., and C.K. Luscombe, "Externally Initiated Regioregular P3HT With Controlled Molecular Weight and Narrow Polydispersity," Journal of the American Chemical Society 131(36):12894-12895, Sep. 2009.
Bryan, Z.J., and A.J. McNeil, "Conjugated Polymer Synthesis via Catalyst-Transfer Polycondensation (CTP): Mechanism, Scope, and Applications," Macromolecules 46(21):8395-8405, Nov. 2013.
Bryan, Z.J., and A.J. McNeil, "Evidence for a Preferential Intramolecular Oxidative Addition in Ni-Catalyzed Cross-Coupling Reactions and Their Impact on Chain-Growth Polymerizations," Chemical Science 4:1620-1624, Apr. 2013.

(Continued)

*Primary Examiner* — Shane Fang
(74) *Attorney, Agent, or Firm* — Christensen O'Connor Johnson Kindness PLLC (57) ABSTRACT

Methods for the preparation of mono- and bis-end-functionalized π-conjugated polymers. In the methods, chalcogens are selectively installed at the polymer terminus or termini.

12 Claims, 5 Drawing Sheets

(56) References Cited

OTHER PUBLICATIONS

Das, R., and P. Harrop, "Printed, Organic & Flexible Electronics Forecasts, Players & Opportunities 2012-2022," <http://www.idtechex.com/research/reports/printed-organic-and-flexible-electronics-forecasts-players-and-opportunities-2012-2022-000301.asp> [retrieved Jan. 6, 2014], 10 pages.

De Boer, B., et al., "Synthesis and Characterization of Conjugated Mono- and Dithiol Oligomers and Characterization of Their Self-Assembled Monolayers," Langmuir 19(10):4272-4284, May 2003.

Doubina, N., et al., "Effect of Initiators on the Kumada Catalyst-Transfer Polycondensation Reaction," Macromolecules 42(20):7670-7677, Oct. 2009.

Doubina, N., et al., "Steric Effects of the Initiator Substituent Position on the Externally Initiated Polymerization of 2-Bromo-5-iodo-3-hexylthiophene," Macromolecules 44(3):512-520, Feb. 2011.

Elmalem, E., et al., "Synthesis and Photophysics of Fully π Conjugated Heterobis-Functionalized Polymeric Molecular Wires via Suzuki Chain-Growth Polymerization," Journal of the American Chemical Society 134(42):17769-17777, Oct. 2012.

Grancharov, G., et al., "Stereocomplexed Materials Based on Poly(3-hexylthiophene)-b-poly(lactide) Block Copolymers: Synthesis by Organic Catalysis, Thermal Properties, and Microscopic Morphology," Macromolecules 43(21):8957-8964, Nov. 2010.

Higashihara, T., et al., "Synthesis of Block Copolymers Consisting of Poly(3-hexylthiophene) and Polystyrene Segments Through Ionic Interaction and Their Self-Assembly Behavior," Polymer Journal 42(1):43-50, Jan. 2010.

Jeffries-El, M., et al., "Facile Synthesis of End-Functionalized Regioregular Poly(3-alkylthiophene)s via Modified Grignard Metathesis Reaction," Macromolecules 38(25):10346-10352, Dec. 2005.

Kempf, C.N., et al., "Amphiphilic Poly(alkylthiophene) Block Copolymers Prepared via Externally Initiated GRIM and Click Coupling," Polymer Chemistry 4(6):2158-2163, Mar. 2013.

Kochemba, W.M., et al., "In Situ Formation of Pyridyl-Functionalized Poly(3-hexylthiophene)s via Quenching of the Grignard Metathesis Polymerization: Toward Ligands for Semiconductor Quantum Dots," Chemistry of Materials 24(22):4459-4467, Nov. 2012.

Krüger, R.A., et al., "End-Group Functionalization of Poly(3-hexylthiophene) as an Efficient Route to Photosensitize Nanocrystalline $TiO_2$ Films for Photovoltaic Applications," Applied Materials & Interfaces 3(6):2031-2041, Jun. 2011.

Ku, S.-Y., et al., "A Modular Strategy for Fully Conjugated Donor-Acceptor Block Copolymers," Journal of the American Chemical Society (JACS) 134(38):16040-16046, Sep. 2012.

Langeveld-Voss, B.M.W., et al., "End-Group Modification of Regioregular Poly(3-alkylthiophene)s," Chemical Communications 1:81-82, 2000.

Lanni, E.L., and A.J. McNeil, "Evidence for Ligand-Dependent Mechanistic Changes in Nickel-Catalyzed Chain-Growth Polymerizations," Macromolecules 43(19):8039-8044, Oct. 2010.

Lee, J.K., et al., "In Situ Hetero End-Functionalized Polythiophene and Subsequent 'Click' Chemistry With DNA," Macromolecular Rapid Communications 33(10):938-942, May 2012.

Lindoy, L.F., "Reactions Involving Metal Complexes of Sulphur Ligands," Coordination Chemistry Reviews 4(1):41-71, Feb. 1969.

Lohwasser, R.H., and M. Thelakkat, "Synthesis of Amphiphilic Rod-Coil P3HT-b-P4VP Carrying a Long Conjugated Block Using NMRP and Click Chemistry," Macromolecules 45(7):3070-3077, Apr. 2012.

Lohwasser, R.H., et al., "Tailor-Made Synthesis of Poly(3-hexylthiophene) With Carboxylic End Groups and Its Application as a Polymer Sensitizer in Solid-State Dye-Sensitized Solar Cells," Journal of Materials Chemistry 19(24):4126-4130, Jun. 2009.

"Materials Characterization and Device Design to Application Development and Full-System Prototyping," Printed and Flexible Electronics—PARC, a Xerox Company, <https://www.parc.com/services/focus-area/flexible-and-LAE/> [retrieved Jan. 6, 2014], 2 pages.

Miyakoshi, R., et al., "Catalyst-Transfer Polycondensation: Mechanism of Ni-Catalyzed Chain-Growth Polymerization Leading to Well-Defined Poly(3-hexylthiophene)," Journal of the American Chemical Society (JACS) 127(49):17542-17547, Dec. 2005.

Mizuno, T., et al., "Facile S-Alkyl Thiocarbamate Synthesis by a Novel DBU-Assisted Carbonylation of Amines With Carbon Monoxide and Sulfur," Tetrahedron 59(8):1327-1331, Feb. 2003.

Monnaie, F., et al., "Synthesis of End-Group Functionalized P3HT: General Protocol for P3HT/Nanoparticle Hybrids," Macromolecules 46(21):8500-8508, Nov. 2013.

Nakamura, K., et al. "Facile Preparation of Poly(3-substituted thiophene) Block Copolymers by Nickel-Catalyzed Deprotonative Polycondensation Without External Generation of Thiophene Organometallic Species," Chemistry Letters 42(10):1200-1202, Oct. 2013.

Okamoto, K., and C.K. Luscombe, "Simple Procedure for Mono- and Bis-End-Functionalization of Regioregular Poly(3-hexylthiophene)s Using Chalcogens," Chemical Communications 50(40):5310-5312, May 2014.

Okamoto, K., et al., "Room-Temperature Carbon-Sulfur Bond Formation From Ni(II) σ-aryl Complex via Cleavage of the S—S Bond of Disulfide Moieties," Applied Organometallic Chemistry 27(11):639-643, Nov. 2013.

Palaniappan, K., et al., "Block Copolymer Containing Poly(3-hexylthiophene) and Poly(4-vinylpyridine): Synthesis and Its Interaction With CdSe Quantum Dots for Hybrid Organic Applications," Journal of Polymer Science Part A: Polymer Chemistry 49(8):1802-1808, Apr. 2011.

Smeets, A., et al., "End Group-Functionalization and Synthesis of Block-Copolythiophenes by Modified Nickel Initiators," Macromolecules 44(15):6017-6025, Aug. 2011.

Smeets, A., et al., "Incorporation of Different End Groups in Conjugated Polymers Using Functional Nickel Initiators," Macromolecules 42(20):7638-7641, Oct. 2009.

Stenzel, M.N., "Bioconjugation Using Thiols: Old Chemistry Rediscovered to Connect Polymers with Nature's Building Blocks," Macro Letters 2(1):14-18, Jan. 2013.

Surin, M., et al., "Regioregular Poly(3-hexylthiophene)-poly(ε-caprolactone) Block Copolymers: Controlled Synthesis, Microscopic Morphology, and Charge Transport Properties," Organic Electronics 11(5):767-774, May 2010.

Tanaka, M., et al., "Alternate Network Film of Thiol Group-Terminated Polythiophene and Gold Nanoparticle," Polymer 48(20):5884-5888, Sep. 2007.

Taniguchi, N., "Alkyl- or Arylthiolation of Aryl Iodide via Cleavage of the S—S Bond of Disulfide Compound by Nickel Catalyst and Zinc," Journal of Organic Chemistry 69(20):6904-6906, Oct. 2004.

Van Den Bergh, K., et al., "Influence of the Presence and Length of an Alkyl Spacer on the Supramolecular Chirality of Block Copoly(thiophene)s," Macromolecules 44(4):728-735, Feb. 2011.

Wang, Q., et al. "Synthesis of End-Capped Regioregular Poly(3-hexylthiophene)s via Direct Arylation," Macromolecular Rapid Communications 33(14):1203-1207, Jul. 2012.

"Welcome to Hoover's! Gain Access and Locate Your Best Prospects in Minutes!" Hoover's Inc., <http://www.hoovers.com> [retrieved Jan. 6, 2014], 2 pages.

Yang, C., et al., "Well-Defined Donor-Acceptor Rod-Coil Diblock Copolymers Based on P3ht Containing C60: The Morphology and Role as a Surfactant in Bulk-Heterojunction Solar Cells," Journal of Materials Chemistry 19(30):5416-5423, Aug. 2009.

Yuan, M., et al., "Constructing Regioregular Star Poly(3-hexylthiophene) via Externally Initiated Kumada Catalyst-Transfer Polycondensation," Macro Letters 1(3):392-395, Mar. 2012.

Zhang, L., et al., "End-Group Stannylation of Regioregular Poly(3-hexylthiophene)s," Polymer Journal 44(11):1145-1148, Nov. 2012.

SYNTHESIS OF CHALCOGEN-CAPPED PI-CONJUGATED POLYMERS

CROSS-REFERENCE TO RELATED APPLICATION

This application claims the benefit of U.S. patent application Ser. No. 61/893,075, filed Oct. 18, 2013, expressly incorporated herein by reference in its entirety.

STATEMENT OF GOVERNMENT LICENSE RIGHTS

This invention was made with Government support under grant no. FA9550-10-1-0430 awarded by the Air Force Office of Scientific Research and grant no. FDMR-0747489 awarded by the National Science Foundation. The Government has certain rights in the invention.

BACKGROUND OF THE INVENTION

End-functionalized π-conjugated polymers are highly desirable for the creation of multifunctional polymers or hybrid materials such as rod-b-coil diblock copolymers, donor-acceptor diblock copolymers and surface-modified inorganic materials for organic photovoltaics. In order to prepare polymer chains bearing one or two end-functionalized groups, the following four approaches can be envisaged: (i) post-functionalization of a purified polymer; (ii) use of a functionalized initiator agent; (iii) termination reaction with functionalized quenching reagent using the same metal catalyst as the polymerization; and (iv) combination of initiator and quenching reagents (combining approaches (ii) and (iii)). The advantage of the first approach (i) is the selective functionalization of either the α- or ω-end, as well as both ends. However, there are some drawbacks with approach (i) in that two separate reactions for polymerization and end-functionalization are required. Also, in some cases, post-modification requires low-temperature conditions involving lithiation procedures, which can promote the aggregation of π-conjugated polymers in the reaction solution. Approaches (ii) and (iii) are effective for introducing one end-group on the polymer in a one-pot reaction. In comparison with the other approaches, approach (iv) has been relatively less investigated; the use of Suzuki-Miyaura coupling-based polymerizations to achieve both α- and ω-end-functionalization. In almost every approach mentioned above, C—C bond formation was used for end-functionalization. Reports concerning carbon-heteroatom end-functionalization are very limited and only C—P and C—Sn bond formation to produce end-functionalized poly(3-hexylthiophenes) (P3HTs) have been reported where approach (i) was used.

Thiol-functionalized polymers are useful for forming self-assembled monolayers (SAMs) on surfaces, and for the thiol click reaction for constructing multi-functionalized materials via thioester linkages. However, thiol end-capped π-conjugated polymers have not undergone full synthetic investigations nor physical property studies.

Despite the advances in the development of synthetic methods for making thiol-end-capped π-conjugated polymers, a need exist for methods for making specifically end-capped polymers. The present invention seeks to fulfill this need and provides further related advantages.

SUMMARY OF THE INVENTION

In one aspect, the invention provides a method for mono-end-functionalizing a π-conjugated polymer with a chalcogen. In one embodiment, the method includes:

polymerizing an aryl monomer by reaction with a Grignard reagent and an aryl nickel catalyst to provide an aryl nickel complex-terminated poly(arylene); and treating the aryl nickel complex-terminated poly(arylene) with a chalcogenating agent followed by treatment with an acid to provide a mono-chalcogen-end-functionalized poly (arylene).

In another aspect, the invention provides a method for bis-end-functionalizing a π-conjugated polymer with a chalcogen. In one embodiment, the method includes:

polymerizing an aryl monomer by reaction with a first Grignard reagent and an aryl nickel catalyst to provide an aryl nickel complex-terminated poly(arylene); and treating the aryl nickel complex-terminated poly(arylene) with a chalcogenating agent and a second Grignard reagent followed by treatment with an acid to provide a bis-chalcogen-end-functionalized poly(arylene).

Suitable aryl monomers include monomers capable of providing π-conjugated polymers. Aryl monomers include substituted and unsubstituted thiophenes, substituted and unsubstituted fluorenes, substituted and unsubstituted phenylenes, substituted and unsubstituted pyridines, and substituted and unsubstituted pyrroles. Representative aryl monomers include 3-hexylthiophenes, 9,9-dialkylfluorenes, 2,5-dialkoxyphenylenes, pyridines, and N-alkylpyrroles. In certain embodiments, the invention provides methods for mono- and bis-end-functionalizing poly(3-hexylthiophene).

DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION OF THE INVENTION

The present invention provides methods for the preparation of end-functionalized pi-conjugated (π-conjugated) polymers. The methods of the invention provide mono- and bis-end functionalized π-conjugated polymers. In the methods, chalcogens (e.g., sulfur and selenium) are selectively installed at the polymer terminus or termini.

In the methods of the invention, the polymerizing step is a Kumada catalyst transfer polymerization (KCTP). Selective end-functionalization results from the quenching step: a C-chalcogen (e.g., S or Se) reductive elimination. In the methods, the final treatment is a protonation to provide the chalcogen-H polymer product (e.g., S—H or Se—H).

The invention thus provides methods for mono- or bis-end functionalized chalcogen-capped polymers (e.g., π-conjugated polymers) formed by Kumada catalyst transfer polymerization. In one aspect, the invention provides a method for mono-end functionalized polymers formed by Kumada catalyst transfer polymerization characterized in that the quenching step comprises treating the nickel complex-terminated polymer with a chalcogenating agent followed by treatment with an acid to provide a mono-chalcogen-end-functionalized polymer. In another aspect, the invention provides a method for bis-end functionalized polymers formed by Kumada catalyst transfer polymerization characterized in that the quenching step comprises treating the nickel complex-terminated polymer with a chalcogenating agent and a second Grignard reagent followed by treatment with an acid to provide a bis-chalcogen-end-functionalized polymer.

In one aspect, the invention provides a method for mono-end-functionalizing a π-conjugated polymer (e.g., a poly (arylene)) with a chalcogen. In one embodiment, the method includes:

polymerizing an aryl monomer by reaction with a Grignard reagent and an aryl nickel catalyst to provide an aryl nickel complex-terminated poly(arylene); and treating the aryl nickel complex-terminated poly(arylene) with a chalcogenating agent followed by treatment with an acid to provide a mono-chalcogen-end-functionalized poly (arylene).

Suitable aryl monomers include monomers capable of providing π-conjugated polymers. Aryl monomers include substituted and unsubstituted thiophenes, substituted and unsubstituted fluorenes, substituted and unsubstituted phenylenes, substituted and unsubstituted pyridines, and substituted and unsubstituted pyrroles. Representative aryl monomers include 3-hexylthiophenes, 9,9-dialkylfluorenes, 2,5-dialkoxyphenylenes, pyridines, and N-alkylpyrroles. In certain embodiment, these substituted aryl monomers have substituents that are alkyl groups, such as straight chain or branched C1-C12 alkyl group.

In one embodiment, the invention provides a method for mono-end-functionalizing poly(3-hexylthiophene) with a chalcogen that includes:

polymerizing a 3-hexylthiophene monomer by reaction with a Grignard reagent and an aryl nickel catalyst to provide an aryl nickel complex-terminated poly(3-hexylthiophene); and treating the aryl nickel complex-terminated poly(3-hexylthiophene) with a chalcogenating agent followed by treatment with an acid to provide a mono-chalcogen-end-functionalized poly(3-hexylthiophene).

In the above method, the quench reaction is C—S reductive elimination and protonation provides the thiol. The protonation step utilizes an acid (e.g., an aqueous acid such as 5 M HCl solution).

The method of the invention is a KCTP method in which a thiophene monomer is treated with a Grignard reagent (e.g., i-PrMgCl) followed by treatment with an aryl nickel catalyst (e.g., Ni(diphenylphosphino)propane dichloride, Ni(dppp)Cl$_2$) to provide a reactive polymer intermediate having an aryl nickel complex at the growing end of the reactive polymer.

A representative method of the invention is described below in which the thiophene monomer is 2-bromo-5-iodo-3-hexylthiophene. However, it will be appreciated that other thiophene monomers can be utilized. Representative thiophene monomers include 2-bromo-5-iodo-3-alkylthiophene and 2,5-dibromo-3-alkylthiophene, where alkyl is selected from C1-C20 alkyl (e.g., methyl, ethyl, propyl, butyl, octyl, decyl, dodecyl, and 2-ethylhexyl).

In the present method, the monomer to be polymerized is treated with a Grignard reagent (Grignard monomer) and an aryl nickel catalyst. Suitable Grignard reagents include simple Grignard reagents (i.e., RMgX, where R is a C1-C12 alkyl group and X is a halide) and Turbo Grignard reagents (i.e., R$_3$MgLi, where R at each occurrence is selected from is a C1-C12 alkyl group). Representative Grignard reagents include RMgX, where R is methyl, ethyl, or isopropyl and X is chloride or bromide (e.g., i-PrMgCl). Representative Turbo Grignard reagents include R$_3$MgLi, where R is independently selected from n-butyl and i-propyl (e.g., nBu$_2$i-PrMgLi and nBu$_3$MgLi).

The method of the invention utilizes an aryl nickel catalyst. In one representative method of the invention described below, the nickel catalyst is Ni(dppp)Cl$_2$. In another representative method of the invention described below, the nickel catalyst is 2-tolylNi(PPh$_3$)$_2$Br. Suitable aryl nickel catalysts have the formula:

where L is mono or bidentate phosphine ligand and subscript n is number of the phosphine ligand(s), n=1 or 2, and X=Cl or Br. In the case of monodentate phosphine ligand, the geometry of two monodentate phosphine ligands is trans on the nickel complex. A bidentate phosphine ligand forms cis geometry except for some wide bite angle ligands (dppb, dcpf, and Xantphos). In certain embodiments, the monodentate ligands are PPh$_3$, PCyPh$_2$, PCy$_3$, PBn$_3$, PPh$_2$Me, PMe$_2$Ph, PMe$_2$Ph, PEt$_3$, and P(n-Bu)$_3$, also the bidentate ligands are 1,2-bis(diphenylphosphino)ethane (dppe), 1,3-bis(diphenylphosphino)propane (dppp), 1,4-bis (diphenylphosphino)butane (dppb), 2,2'-bis (diphenylphosphino)-1,1'-binaphthyl (BINAP), 1,1'-bis (diphenylphosphino)ferrocene (dppf), 1,1'-bis (dicyclohexylphosphino)ferrocene (dcpf), 9,9-dimethyl-4,5-bis(diphenylphosphino) xanthene (Xantphos), and 2-[2-(diphenylphosphino)ethyl] pyridine (Pyphos).

In certain embodiments, the nickel catalyst is 2-arylNi (PPh$_3$)$_2$X, where aryl is phenyl, 2-tolyl, 5-functionalized 2-tolyl, thienyl, 2-alkyl thienyl (alkyl is C1-C6 alkyl), and X is Cl or Br. In other embodiments, the nickel catalyst, Ni(dppp)X$_2$, where X is Cl or Br. In further embodiments, the nickel pre-catalysts can be prepared in situ by the reaction of Ni(acetylacetonate)$_2$ [Ni(acac)$_2$] with dppp, Ni(1,5-cyclooctadiene)$_2$ [Ni(COD)$_2$] with N-heterocyclic carbene ligands (NHC ligands), such as 1,3-bis(2,6-diisopropylphenyl)imidazolidin-2-ylidene (SIPr) and 1,3-bis(2,6-diisopropylphenyl)imidazole-2-ylidene (IPr), or Ni(COD)$_2$ with allyltrifluoroacetate and dppp.

To install sulfur, the chalcogenating agent is elemental sulfur (e.g., sulfur powder, S$_8$). To install selenium, the chalcogenating agent is selenium.

The methods of the invention can also install a chalogen functional group. In one embodiment, the chalcogenating agent is carbon disulfide and install a CS$_2$— group.

In certain embodiments, the aryl nickel complex-terminated poly(3-hexylthiophene) is treated with a chalcogenating agent and a base. The addition of base is optional. The solubility of sulfur in organic solvents such as tetrahydrofuran (THF) is limited. Therefore, addition of base can support the miscibility of sulfur in the solution (increase sulfur solubility).

In the methods of the invention that utilize a base, in certain embodiments, the base is a nitrogen base. A representative nitrogen base is 1,8-diazabicyclo[5.4.0]undec-7-ene (DBU). In certain embodiments, excess phosphine ligand (PPh$_3$, dppp) can act in a manner similar to the base (e.g., DBU). The role of the base is to cleave the S—S bond. The chemical bond energy of S—S bond is about 210-270 kJ/mol, and can be cleaved by base or phosphine. Although the bond energy is relatively low, in the absence of chemical treatment, reaction temperatures of at least about 100° C. ware required. In certain embodiments, the ratio of base:sulfur (or selenium) ranges from about 1:10 to 1:1.

In certain embodiments, the chalcogenating agent is used in molar excess. The term "excess amount" refers to an amount relative to the nickel catalyst. The amount of polymer end group converges to the amount of nickel catalyst according with polymerization, because the growing polymer end includes (polymer)aryl Ni catalyst. Therefore, the minimum requisite amount will be the same amount of nickel catalyst. In certain embodiments, excess chalcogenating agent (e.g., elemental sulfur) is used relative to the monomer so as provide the desired polymer length (i.e., whole range of "n" which is the number of repeating units).

In certain embodiments, the aryl nickel complex-terminated poly(3-hexylthiophene) is an α-aryl-terminated ω-aryl nickel complex-terminated poly(3-hexylthiophene) prepared by initiating polymerization of the thiophene monomer with an aryl nickel initiator. Suitable aryl nickel initiators include the aryl nickel catalysts described above. In one embodiment, the aryl nickel initiator is (aryl)N(PPh$_3$)$_2$Br.

In another aspect, the invention provides a method for bis-end-functionalizing a π-conjugated polymer (e.g., poly(arylene)) with a chalcogen. In one embodiment, the method includes:

polymerizing an aryl monomer by reaction with a first Grignard reagent and an aryl nickel catalyst to provide an aryl nickel complex-terminated poly(arylene); and treating the aryl nickel complex-terminated poly(arylene) with a chalcogenating agent and a second Grignard reagent followed by treatment with an acid to provide a bis-chalcogen-end-functionalized poly(arylene).

The polymerizing step for the bis-end-functionalization of the π-conjugated polymer is as described above for mono-end functionalization and the reagents and methodologies described above are applicable to the bis-end functionalization method.

In one embodiment, the invention provides a method for bis-end-functionalizing poly(3-hexylthiophene) with a chalcogen that includes:

polymerizing a 3-hexylthiophene monomer by reaction with a first Grignard reagent and an aryl nickel catalyst to provide an aryl nickel complex-terminated poly(3-hexylthiophene); and treating the aryl nickel complex-terminated poly(3-hexylthiophene) with a chalcogenating agent and a second Grignard reagent followed by treatment with an acid to provide a bis-chalcogen-end-functionalized poly(3-hexylthiophene).

In these methods, the first Grignard reagent, aryl nickel catalyst, and acid are as described above.

In the bis-end functionalization methods, the chalcogenating agent is a substituted silyl agent. For installing sulfur, the chalcogenating agent is substituted silylthiol. As used herein, the terms "substituted silylthiol" or "silyl-protected thiol" are used interchangeably and refer to a thiol in which the sulfur is covalently coupled to a silyl group (i.e., $R^aS$—Si($R^b$)($R^c$)($R^d$), where $R^a$, $R^b$, $R^c$, and $R^d$ are independently selected from hydrogen and C1-C6 alkyl groups). In certain embodiments, the substituted silylthiol is an alkyl-substituted silylthiol. A representative silylthiol is tri-isopropylsilylthiol (TIPS-SH).

In the above methods, suitable second Grignard reagents include those noted above (e.g., RMgX, where R is selected from n-butyl, tert-butyl, ethyl, isobutyl, n-hexyl). In addition to Grignard reagents, lithium reagents can also be utilized (e.g., alkyl lithium reagents such as n-BuLi and lithium bis(trimethylsilyl)amide (LiHMDS)).

In certain embodiments, the ratio of chalcogenating agent to second Grignard reagent is about 1:1. In methods that install sulfur, the product thiol proton (S—H) is highly acidic and can act as an acid. However, if there is residual second Grignard reagent in the reaction mixture, it can be an end capping reagent itself.

Depending on the chalcogenating agent (e.g., silyl-protected thiol), in certain embodiments, the method further includes treating the bis-chalcogen-end-functionalized polymer with a deprotection reagent. Suitable deprotection reagents cleave the S—Si bond to provide a bis-thiol-end-functionalized polymer. In one embodiment, the deprotection reagent is a fluoride (e.g., tetrabutyl ammonium fluoride, TBAF).

In the above methods, treating the aryl nickel complex-terminated polymer with the chalcogenating agent and the second Grignard reagent includes treating at a temperature above room temperature (e.g., about 65 to about 70° C.).

The following is a description of representative methods of the invention for mono- and bis-end-chalcogen functionalization of poly(3-hexylthiophene).

In one aspect, the present invention provides an efficient synthesis of regioregular poly(3-hexylthiophene-2,5-diyl)s (rr-P3HTs) capped with chalcogens using a quenching method. Thiol (SH) end groups are selectively installed at the terminating end (ω-end) or at both the initiating (α-) and ω-ends using sulphur powder or triisopropylsilanethiol (TIPS-SH), respectively.

When using the Kumada catalyst transfer polymerization (KCTP) for the controlled synthesis of P3HT, the σ-aryl Ni complex remains on the growing end of the π-conjugated polymer as a σ-aryl nickel complex. In the present method, a C—S bond is introduced in-situ on the end of π-conjugated polymers using a one-pot reaction by using a combination of KCTP and a C—S bond forming reaction.

In representative methods of the invention, a procedure is described to introduce SH end-groups on rr-P3HT using sulphur powder/1,8-diazabicyclo[5.4.0]undec-7-ene (S$_8$/DBU) or TIPS-SH/i-PrMgCl as quenching reagents. The versatility of the quenching method was demonstrated using selenium powder/DBU and carbon disulfide (CS$_2$) to produce SeH and CS$_2$— terminated P3HT.

Figure 1:
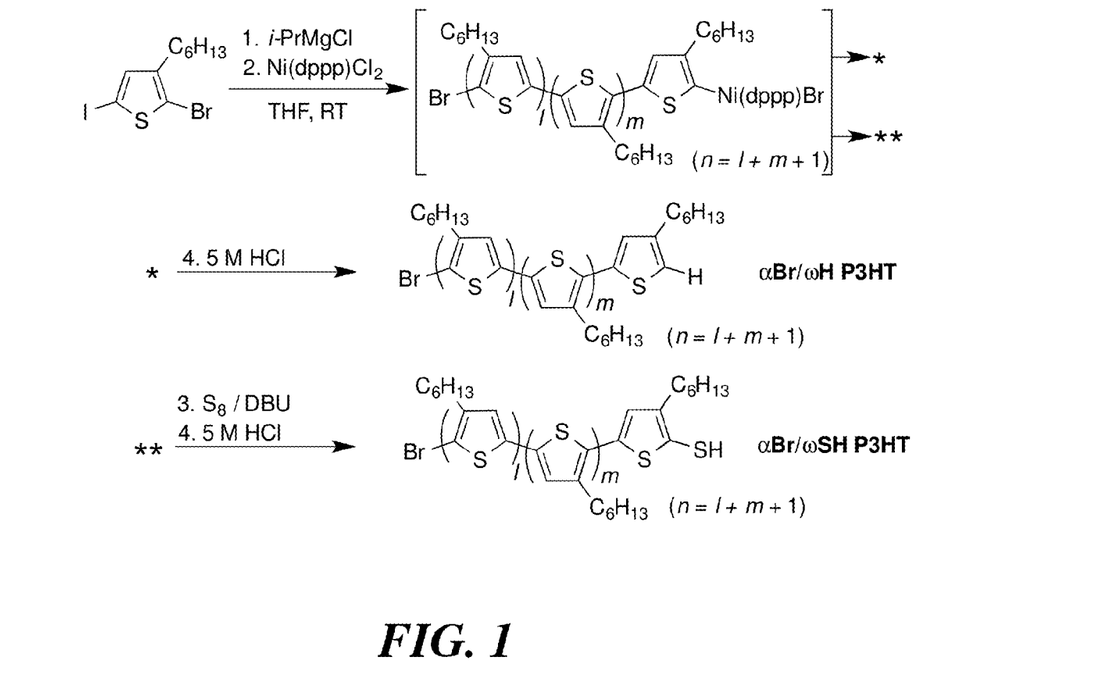
FIG. 1 is a schematic illustration of a representative method of the invention for preparing a mono-end-functionalized P3HT (αBr/ωSH P3HT) (n is the total number of repeating units).
Figure 2:
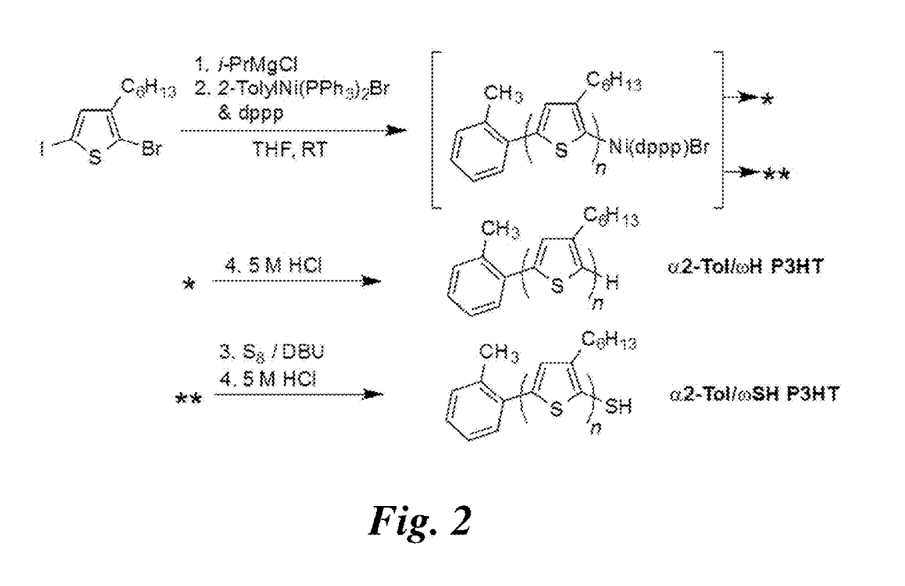
FIG. 2 is a schematic illustration of a representative method of the invention for preparing a mono-end-functionalized P3HT (α2-Tol/ωSH P3HT) (n is the total number of repeating units).
Figure 3A:
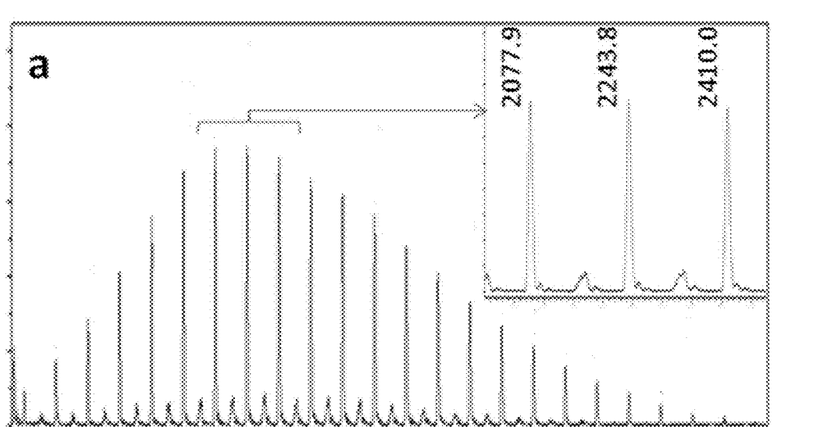
FIGS. 3A and 3B compare MALDI-TOF-MS profiles of αBr/ωH P3HT (3A) and αBr/ωSH P3HT (3B) prepared by the method illustrated in FIG. 1. The insets are magnified images of the highest-peak region. Calculated mass for αBr/ωSH P3HT: 2108.4, 2274.7, 2240.9.
Figure 3B:
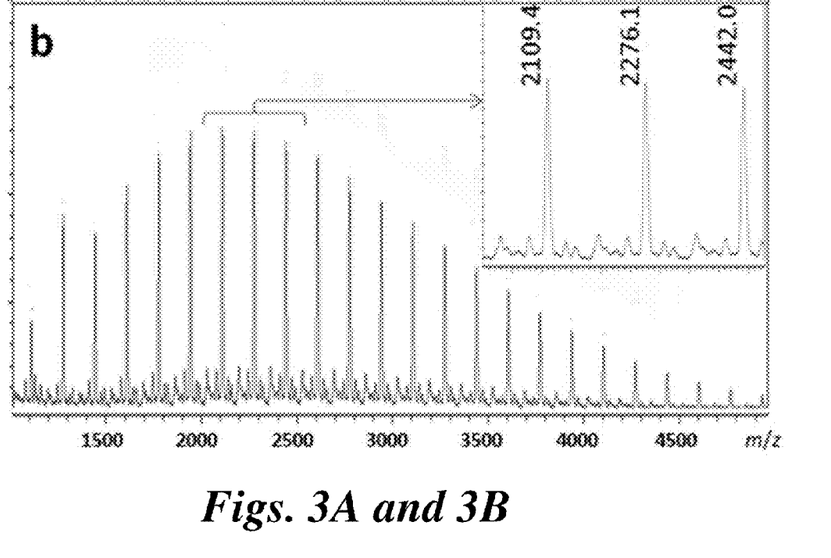

A schematic illustration of a representative method of the invention for preparing a mono-end-functionalized P3HT (αBr/ωSH P3HT) is shown in FIG. 1. Referring to FIG. 1, rr-P3HT was synthesized using KCTP, as described in Okamoto et al., *Appl. Organometal. Chem.*, 2013, DOI: 10.1002/aoc.2975; DOI: 10.1021/ja0556880; and DOI: 10.1021/ja9054977. Ni(dppp)Cl$_2$ catalyst was added to the thiophene monomer, and the reaction mixture was divided into two equal portions. One portion was quenched with 5 M HCl while the other was quenched with S$_8$/DBU at room temperature. FIG. 3A shows the MALDI-TOF mass spectrum of the polymer quenched with 5 M HCl. The major peaks correspond to the expected product, αBr/ωH P3HT. FIG. 3B shows the MALDI-TOF mass spectrum of the polymer quenched with S$_8$/DBU. Comparison of the mass spectra in insets of FIGS. 2A and 3B reveals that the mass difference between the major peaks is 32 Da (for example, 2109.4-2077.9=31.5), which corresponds to the atomic weight of sulphur, confirming that αBr/ωSH P3HT was synthesized. Quenching in the absence of DBU also afforded αBr/ωSH P3HT. However, the reaction speed was slower compared to the reaction with DBU, and we found that only 86% of chains were SH terminated. The reduced rate may be due to DBU assisting in S—S bond cleavage and stabilizing the sulphur anion in the reaction. The α- and ω-end-bisfunctionalized P3HT was not detected by MALDI-TOF-MS even when the reaction mixture was refluxed after addition of the quencher. The lack of formation of the bisfunctionalized P3HT may be due to excess amount of elemental sulphur used, which prevents regeneration of Ni(0). Approach (iv) using the σ-aryl Ni initiator (FIG. 2) and obtained two α2-tolyl end-capped P3HTs using the quenching protocol.

Figure 4A:
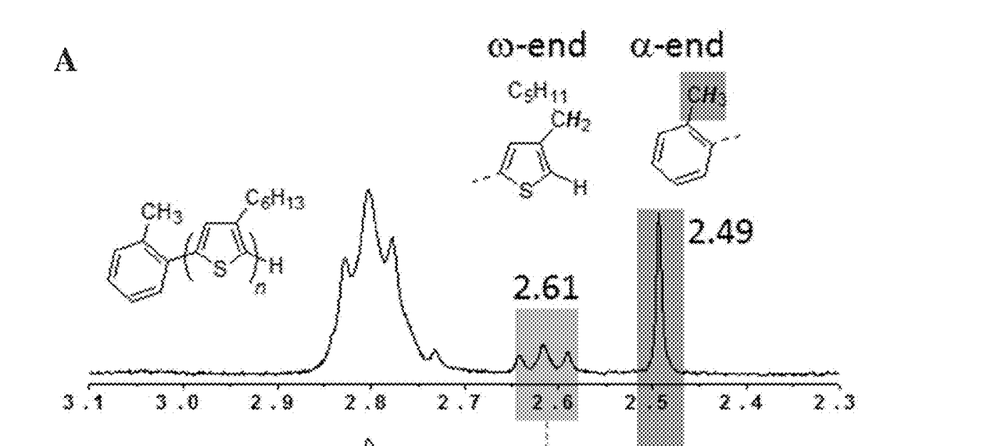
FIGS. 4A and 4B compare $^1$H NMR spectra of α2-Tol/ωH P3HT (4A) and α2-Tol/ωSH P3HT (4B) prepared by the method illustrated in FIG. 2.
Figure 4B:
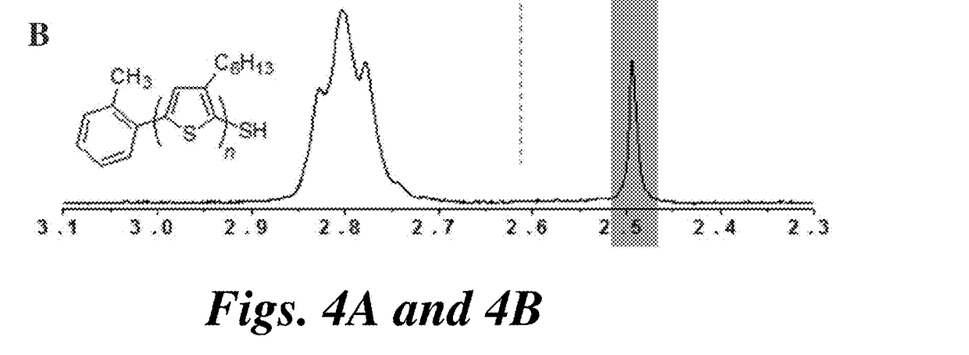

The $^1$H NMR spectra show that the ω-end α-methylene protons of 3-hexylthiophene shifted to a lower magnetic field upon thiolation, while the α-end methyl groups did not shift (FIG. 4A). The ratio of ω-end SH groups in the final product was estimated from the integrals of the methyl protons on the α-end tolyl group (δ=2.49 (s, 3 H)) and the ω-end α-methylene protons (δ=2.61 (t, 2H)). The lack of any signal at 2.61 ppm in FIG. 4B shows that 100% of the P3HT chains were SH terminated at least within the accuracy of the NMR.

Figure 5:
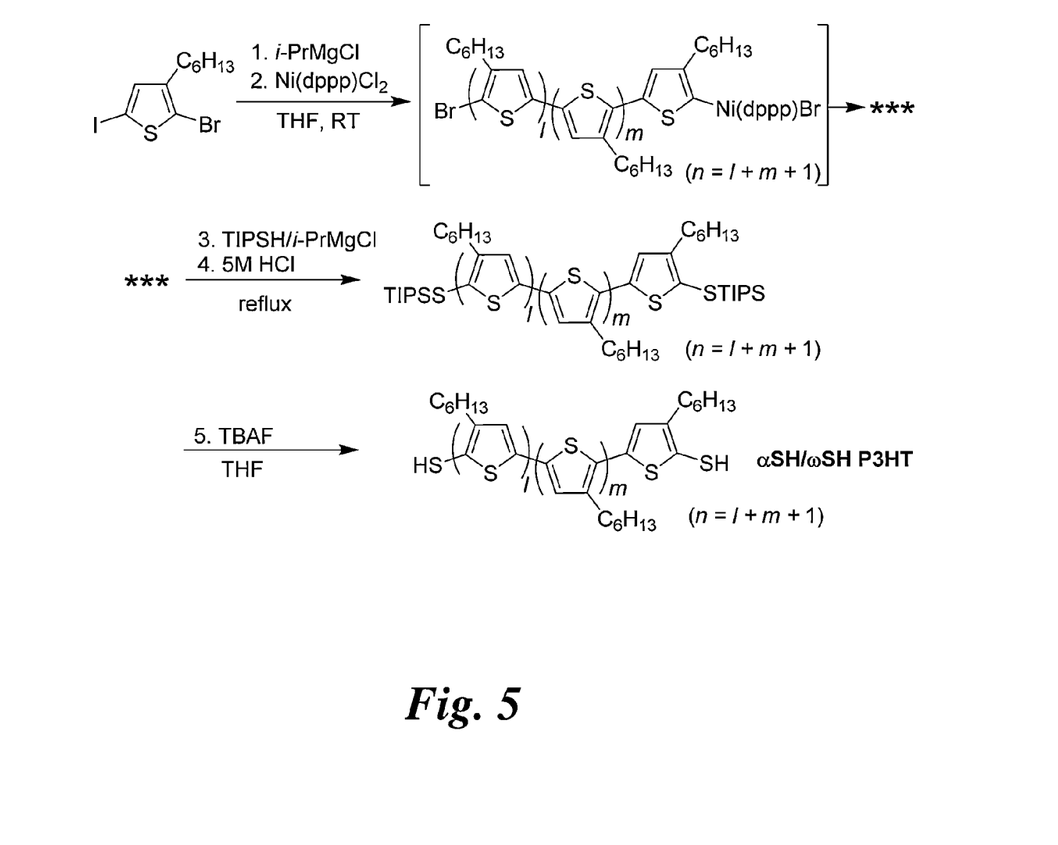
FIG. 5 is a schematic illustration of a representative method of the invention for preparing a bis-end-functionalized P3HT (αSH/ωSH P3HT).

The synthetic route of bis-thiol end-capped P3HT (αSH/ωSH P3HT) is shown in FIG. 5. The use of TIPS-SH/i-PrMgCl under reflux, instead of S$_8$/DBU at room temperature, led to the bis-functionalization of P3HT. The end-capping mechanism can be explained by the proposed mechanism for chain-growth P3HT synthesis where C—C bond formation at both the α- and ω-ends has been observed. The formation of αS-TIPS/ωS-TIPS P3HT indicates that Ni(0) is regenerated after ω-end C—S bond formation and can insert into the α-end C—Br bond, which then allows for C—S bond formation at the α-end as well. When the TIPS-SH/i-PrMgCl quenching reaction was performed at room temperature, end-functionalized P3HT was not obtained. The TIPS group is bulky and reflux conditions may be required to achieve transmetallation.

For the removal of the TIPS protecting group, three different post-treatment conditions were tested initially: 5 M HCl, MeOH, and 0.3 M TBAF in MeOH. Because the reaction mixture contained 2-iodopropane, a side product of Grignard monomer preparation, alcohol and base solutions induced S—Si bond cleavage and subsequent undesirable thioetherification. The MALDI-TOF spectra show clear differences between the three treatments. To avoid thioetherification, αS-TIPS/ωS-TIPS P3HT was isolated, treated with 0.3 M TBAF CHCl$_3$ solution for 10 min, and washed with 0.1 M aq. HCl revealing the target αSH/ωSH P3HT.

Using the simple quenching method by approaches (iii) and (iv), other chalcogen-containing end-capping reagents were examined. The end-capping results for various quenchers are summarized in Table 1. The ω-end selenol (SeH) capped P3HT was prepared using Se/DBU using similar quenching methods as that of S$_8$/DBU-quenched P3HT (Table 1, entry 4. Interestingly, when the polymerization reaction mixture was quenched with CS$_2$, CS$_2$ insertion occurred at the ω-end and the ω-end CS$_2$ trapped the Ni(dppp) complex (Table 1, entries 5 and 6). Even with extensive washing with 5 M HCl or saturated EDTA disodium solution, removal of Ni(dppp) to reveal CS$_2$H end-capped P3HT was not observed.

TABLE 1

Summary of End-Capping Reactions

| Entry | Ni cat. | Quencher | End Group[a] α-end | ω-end |
|---|---|---|---|---|
| 1 | Ni(dppp)$_2$Cl$_2$ | 5M HCl[b] | Br 92% | H 100% |
|   |   | S$_8$/DBU 5M HCl | Br 92% | SH 92% |
| 2 | 2-tolylNi(dppp)Br | 5M HCl[c] | 2-Tolyl 100% | H 100% |
|   |   | S$_8$/DBU 5M HCl | 2-Tolyl 100% | SH 95% |
| 3 | Ni(dppp)$_2$Cl$_2$ | TIPS-SH/ i-PrMgCl/ 5M HCl | SH[d] 72% | SH[d] 72% |
| 4 | 2-tolylNi(dppp)Br | Se/DBU | 2-Tolyl 100% | SeH 78% |
| 5 | Ni(dppp)$_2$Cl$_2$ | CS$_2$ | Br 100% | CS$_2$Ni 100% |
| 6 | 2-tolylNi(dppp)Br | CS$_2$ | 2-Tolyl 100% | CS$_2$Ni 100% |

[a]End capping incorporation ratios were estimated from each MALDI-TOF MS spectrum,
[b]$M_n$ = 3.3k, PDI = 1.33,
[c]$M_n$ = 2.9k, PDI = 1.17. Determined by SEC relative to polystyrene standards using THF as eluent.
[d]After deprotection by TBAF.

In summary, the invention provides procedures to selectively install thiols on P3HT at the ω-end or at both the α- and ω-ends using nickel catalysed C—S bond formation. This procedure is also effective for the installation of SeH and CS$_2$ ω-end groups. Because the quenching method is a one-pot reaction, it is a practical and important method for modifying not only P3HT, but also other π-conjugated polymers prepared by KCTP.

Abbreviations

αBr/ωH P3HT: α-2-bromo-3-hexylthiophene-5-yl-ω-3-hexylthiophene-5-yl-poly(3-hexylthiophene-2,5-diyl)

αBr/ωSH P3HT: α-2-bromo-3-hexylthiophene-5-yl-ω-2-thiol-3-hexylthiophene-5-yl-poly(3-hexylthiophene-2,5-diyl)

α2-Tol/ωH P3HT: α-2-tolyl-ω-3-hexylthiophene-5-yl-poly(3-hexylthiophene-2,5-diyl)

α2-Tol/ωSH P3HT: α-2-tolyl-ω-2-thiol-3-hexylthiophene-5-yl-poly(3-hexylthiophene-2,5-diyl)

αSH/ωSH P3HT: α-2-thiol-3-hexylthiophene-5-yl-ω-2-thiol-3-hexylthiophene-5-yl-poly(3-hexylthiophene-2,5-diyl)

α2Tol/ωSeH P3HT: α-2-tolyl-ω-2-selenol-3-hexylthiophene-5-yl-poly(3-hexylthiophene-2,5-diyl)

TIPS: triisopropylsilyl

Instrumentation and Materials $^1$H NMR spectra were obtained on Bruker AV-300 and AV-400 spectrometers using CDCl$_3$ as solvent (peak position δ$^1$H=7.26 ppm) and tetramethylsilane was used as an internal standard for $^1$H NMR spectra (0.00 ppm) and $^{31}$P{$^1$H} spectra were referenced to external H$_3$PO$_4$ (0.00 ppm). Number average molecular weight ($M_n$) were determined using end group analysis by $^1$H NMR, and size exclusion chromatography (Viscotek model 305 triple detector array at 30° C. (RI, viscometer, light scattering), columns: Viscotek I-MBHMW-3078 (×2), mobile phase: THF, flow rate: 1 mL/min, injection volume: 100 μL, the molecular weights of polymers and the polydispersities (PDI) were determined by GPC relative to polystyrene standards). MALDI-TOF mass spectra were recorded on a Bruker Autoflex II spectrometer using terthiophene as the sample matrix. Samples were prepared by dissolving about 0.5 mg in 100 μL of matrix solution in dichloromethane and approximately 1.5 μL of this solution was deposited on the plate. The MALDI experiments were performed in both the linear positive mode and reflectron positive mode.

All reactions were carried out under a nitrogen atmosphere using standard Schlenk techniques. 2-bromo-3-hexylthiophene, (diacetoxyiodo)benzene, iodine, 2.0 M i-PrMgCl THF solution, Ni(dppp)Cl$_2$, sulphur powder, DBU, triisopropylsilanethiol (TIPS-SH), selenium powder, anhydrous carbon disulfide (CS$_2$), 2,2':5',2''-terthiophene (for a MALDI-TOF mass matrix), all solvents (anhydrous THF, CHCl$_3$, hexenes, acetone, methanol), aqueous HCl were purchased from Aldrich, Alfa Aesar or Fisher Scientific and used without further purification. The monomer 2-bromo-5-iodo-3-hexylthiophene and the catalyst 2-tolylNi(PPh$_3$)$_2$Br were synthesized according to literature procedures (H. A. Bronstein and C. K. Luscombe, *J. Am. Chem. Soc.*, 2009, 131, 12894).

General Procedure for Polymer Synthesis

The general procedure (Table 1, entry 1) for the synthesis of selectively end-capped P3HT is as follows. A Schlenk tube was charged with 2-bromo-5-iodo-3-hexylthiophene (1.0 mmol, 0.373 g), well-dried LiCl (2.0 mmol, 0.086 g), and THF (9.5 mL). 2.0 M i-PrMgCl THF solution (0.5 mL, 1.0 mmol) was added via syringe at 0° C. for 10 min, then the reaction mixture was allowed to stir at room temperature for 1 h. Ni(dppp)Cl$_2$ (43.4 mg, 8 mol %) was added in one portion at room temperature. After the reaction mixture had been stirred at room temperature for 1 h, it was equally divided into two portions (5 mL×2).

Proton Termination for αBr/ωH P3HT

One of the portions was quenched with 5 M HCl and the residue was added to 50 mL MeOH. The precipitate was washed with MeOH and acetone. The washed polymer was dried in vacuo to afford rr-P3HT (75% yield).

$^1$H NMR (300 MHz, CDCl$_3$): δ 6.98 (s, 1 H), 2.80 (t, J=7.7 Hz), 2.61 (α CH$_2$ peak of ω-end 3-hexylthiophene-5-yl), 2.57 (α CH$_2$ peak of α-end 2-bromo-3-hexylthiophene-5-yl, the total number of proton between δ 2.83-2.57 is 2 H) 1.71 (quint, J=7.6 Hz, 2 H), 1.48-1.38 (m, 2 H), 1.37-1.30 (m, 4 H), 0.92 (t, J =7.2 Hz, 3 H). $^1$H NMR, DP=10.0 (number average molecular weight: M$_n$=1.6 k),[1] MALDI-TOF MS peak top: DP=12.6 (2.1 k).

Thiol Termination for αBr/ωSH P3HT

The other portion was poured into the mixture of sulphur power (S$_8$, 1.25 mmol, 40 mg) and 1,8-diazabicyclo[5.4.0]undec-7-ene (DBU, 0.16 mmol, ca. 1/8 eq of S$_8$), 23.4 μL). The reaction mixture was stirred for 30 min, and 5 M HCl (10 mL) was added. Following the above purification procedure for 5 M HCl quenched P3HT, polymer powder was obtained (77% yield).

$^1$H NMR (300 MHz, CDCl$_3$): δ 6.98 (s, 1 H), 2.80 (t, J=7.7 Hz), 2.54 (α CH$_2$ peak of α-end 2-bromo-3-hexylthiophene-5-yl, the total number of proton between δ 2.83-2.51 is 2 H) 1.71 (quint, J=7.6 Hz, 2 H), 1.48-1.23 (m, 6 H), 0.91 (t, J=7.2 Hz, 3 H). $^1$H NMR: DP=10.0 (M$_n$=1.6 k), MALDI-TOF MS peak top: DP=12.0 (2.1 k).

Dithiol Termination for αSH/ωSH P3HT

After standard P3HT synthesis, the reaction was quenched with a premixed solution of TIPS-SH/i-PrMgCl 1:1 (TIPS-SH, 1.0 mmol, 0.215 mL and 2 M i-PrMgCl THF solution, 0.5 mL). The reaction mixture was refluxed for 30 min with stirring. Following the above purification procedure for 5 M HCl quenched P3HT, polymer powder was obtained. The isolated αS-TIPS /ωS-TIPS P3HT was treated with 0.3 M TBAF CHCl$_3$ solution (50 mL) and after 10 min, the residue was washed with 0.1 M HCl (70 mL×2). After the solvent was removed under reduced pressure, unprotected αSH/ωSH P3HT was obtained (70%, yield).

$^1$H NMR (300 MHz, CDCl$_3$): δ 6.98 (s, 1 H), 2.80 (t, J=7.7 Hz, 2 H), 1.71 (quint, J=7.6 Hz, 2 H), 1.48-1.30 (m, 6 H), 0.91 (t, J=7.2 Hz, 3 H). NMR: DP=unknown, due to no clear signals of end group on NMR spectra, MALDI-TOF MS peak top: DP=11.0 (1.9 k).

CS$_2$ Termination for αBr/ωCS$_2$Ni(dppp) P3HT

To the 1.0 mmol scale polymerization reaction mixture, carbon disulfide (CS$_2$, 1.0 mmol, 61 μL) was added. After the CS$_2$-quenched reaction mixture was stirred for 30 min, 5 M HCl (10 mL) was added to the reaction mixture. Following the above purification procedure for 5 M HCl quenched P3HT, polymer powder was obtained.

$^1$H NMR (300 MHz, CDCl$_3$): δ 6.98 (s, 1 H), 2.80 (t, J=7.7 Hz), 2.57 (α CH$_2$ peak of α-end 2-bromo-3-hexylthiophene-5-yl, the total number of proton between δ 2.80-2.57 is 2 H), 1.71 (quint, J=7.6 Hz, 2 H), 1.48-1.38 (m, 2 H), 1.37-1.30 (m, 4 H), 0.91 (t, J=7.2 Hz, 3 H), 7.75 (m, dppp), 7.30 (m, dppp), 1.19 (m, dppp), 0.85 (m, dppp). $^{31}$P NMR (202 MHz, CDCl$_3$): δ 9.4 ppm. $^1$H NMR, DP=16.0 (M$_n$=2.6 k), MALDI-TOF MS peak top: DP=5.0 (1.6 k).

Externally initiated rr-P3HTs was prepared from the above Grignard monomer preparation using 8 mol % of 2-tolylNi(PPh$_3$)$_2$Br, as generally described in Luscombe et al., JACS, 2009, 131,12894. The polymerization reaction mixtures were quenched using the above quenching methods unless otherwise noted.

α2-tol/ωH P3HT $^1$H NMR (300 MHz, CDCl$_3$): δ 7.43 (m, 2 H), 7.24 (m, 2 H), 6.98 (s, 1 H), 2.80 (t, J=7.7 Hz), 2.61 (α CH$_2$ peak of ω-end 3-hexylthiophene-5-yl, the total number of proton between δ 2.80-2.61 is 2 H), 2.49 (CH$_3$ peak of α-end tolyl) 1.71 (quint, J=7.6 Hz, 2 H), 1.48-1.38 (m, 2 H), 1.37-1.30 (m, 4 H), 0.91 (t, J=7.2 Hz, 3 H). $^1$H NMR, DP=14.0 (M$_n$=2.4 k),[2] MALDI-TOF MS peak top: DP=16.0 (2.7 k).

α2-tol/ωSH P3HT $^1$H NMR (300 MHz, CDCl$_3$): δ 7.43 (m, 2 H), 7.24 (m, 2 H), 6.98 (s, 1 H), 2.80 (t, J=7.7 Hz, 2 H), 2.49 (CH$_3$ peak of α-end tolyl) 1.71 (quint, J=7.6 Hz, 2 H), 1.48-1.38 (m, 2 H), 1.37-1.30 (m, 4 H), 0.91 (t, J=7.2 Hz, 3 H). $^1$H NMR, DP=14.0 (M$_n$=2.4 k),[2] MALDI-TOF MS peak top: DP=16.0 (2.6 k).

Selenol Termination for α2-tol/ωSeH P3HT

The 1.0 mmol scale polymerization reaction mixture was poured into the mixture of well-mixed selenium power (Se, 1.25 mmol, 98.7 mg) and 1,8-diazabicyclo[5.4.0]undec-7-ene (DBU, 0.16 mmol, ca. 1/8 eq of Se), 23.4 μL). After the selenium quenched reaction mixture was stirred overnight, 5 M HCl (10 mL) was added to the reaction mixture. Following the above purification procedure for 5 M HCl quenched P3HT, polymer powder was obtained.

$^1$H NMR (300 MHz, CDCl$_3$): δ 7.43 (m, 2 H), 7.24 (m, 2 H), 6.98 (s, 1 H), 2.80 (t, J=7.7 Hz, 2 H), 2.49 (CH$_3$ peak of α-end tolyl), 1.71 (quint, J=7.6 Hz, 2 H), 1.48-1.38 (m, 2 H), 1.37-1.30 (m, 4 H), 0.91 (t, J=7.2 Hz, 3 H). $^1$H NMR: DP=10.0 (M$_n$=1.8 k), MALDI-TOF MS peak top: DP=13.0 (2.3 k).

α2-tol/ωCS$_2$Ni(dppp)Br P3HT $^1$H NMR (300 MHz, CDCl$_3$): δ 7.43 (m, 2 H), 7.24 (m, 2 H), 6.98 (s, 1 H), 2.80 (t, J=7.7 Hz, 2 H), 2.49 (CH$_3$ peak of α-end tolyl), 1.71 (quint, J=7.6 Hz, 2 H), 1.48-1.38 (m, 2 H), 1.37-1.30 (m, 4 H), 0.91 (t, J=7.2 Hz, 3 H), 7.73 (m, dppp), 7.30 (m, dppp), 1.19 (m, dppp), 0.85 (m, dppp). $^{31}$P NMR (202 MHz, CDCl$_3$): δ 9.4 ppm. $^1$H NMR: DP=8.2 ($M_n$=1.4 k), MALDI-TOF MS peak top: DP=10.0 (2.3 k).

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for mono-end-functionalizing a poly(arylene) with a chalcogen, comprising:
    polymerizing an aryl monomer by reaction with a Grignard reagent and an aryl nickel catalyst to provide an aryl nickel complex-terminated poly(arylene); and
    treating the aryl nickel complex-terminated poly(arylene) with a chalcogenating agent followed by treatment with an acid to provide a mono-chalcogen-end-functionalized poly(arylene).

2. The method of claim 1, wherein the aryl monomer is selected from the group consisting of substituted and unsubstituted thiophenes, substituted and unsubstituted fluorenes, substituted and unsubstituted phenylenes, substituted and unsubstituted pyridines, and substituted and unsubstituted pyrroles.

3. A method for mono-end-functionalizing poly(3-hexylthiophene) with a chalcogen, comprising:
    polymerizing a 3-hexylthiophene monomer by reaction with a Grignard reagent and an aryl nickel catalyst to provide an aryl nickel complex-terminated poly(3-hexylthiophene); and
    treating the aryl nickel complex-terminated poly(3-hexylthiophene) with a chalcogenating agent followed by treatment with an acid to provide a mono-chalcogen-end-functionalized poly(3-hexylthiophene).

4. The method of claim 3, wherein chalcogenating agent is elemental sulfur.

5. The method of claim 3, wherein chalcogenating agent is selenium.

6. The method of claim 3, wherein chalcogenating agent is carbon disulfide.

7. The method of claim 3, wherein the aryl nickel complex-terminated poly(3-hexylthiophene) is treated with a chalcogenating agent and a base.

8. The method of claim 7, wherein the base is a nitrogen base.

9. The method of claim 7, wherein the base is 1,8-diazabicyclo[5.4.0]undec-7-ene.

10. The method of claim 3, wherein the chalcogenating agent is in molar excess.

11. The method of claim 3, wherein the aryl nickel complex-terminated poly(3-hexylthiophene) is an α-aryl-terminated ω-aryl nickel complex-terminated poly(3-hexylthiophene) prepared by initiating polymerization of the thiophene monomer with an aryl nickel initiator.

12. The method of claim 11, wherein the aryl nickel initiator is (aryl)Ni(PPh$_3$)$_2$Br.

* * * * *